United States Patent
Carpenter et al.

(10) Patent No.: US 7,520,573 B2
(45) Date of Patent: Apr. 21, 2009

(54) SHADOW ZONE FAULT DETECTION

(75) Inventors: Scott E. Carpenter, Livonia, MI (US);
Richard L. Gillespie, Canton, MI (US);
Eugen Goebel, Dahlheim (DE); Ingo Alfter, Sinzig (DE)

(73) Assignee: Kelsey-Hayes Company, Livonia, MI (US)

( * ) Notice: Subject to any disclaimer, the term of this patent is extended or adjusted under 35 U.S.C. 154(b) by 235 days.

(21) Appl. No.: 11/315,574

(22) Filed: Dec. 22, 2005

(65) Prior Publication Data

US 2007/0159003 A1 Jul. 12, 2007

(51) Int. Cl.
*B60T 8/88* (2006.01)
(52) U.S. Cl. .............................. 303/122.08; 303/122.05
(58) Field of Classification Search ................. 303/122, 303/122.04, 122.05, 122.06, 122.08; 702/148
See application file for complete search history.

(56) References Cited

U.S. PATENT DOCUMENTS

| | | | |
|---|---|---|---|
| 4,115,756 A * | 9/1978 | DiCecio | |
| 4,233,599 A * | 11/1980 | Brearley | |
| 4,270,809 A * | 6/1981 | Ohmori et al. | |
| 4,287,505 A * | 9/1981 | Ohmori et al. | |
| 4,805,447 A * | 2/1989 | Meguro et al. | |
| 4,829,245 A | 5/1989 | Echasseriau et al. | |
| 4,912,969 A * | 4/1990 | Ishizehi | |
| 4,969,695 A * | 11/1990 | Maehata et al. | |
| 5,032,790 A | 7/1991 | Johnson | |
| 5,138,556 A * | 8/1992 | Yoshino | |
| 5,404,304 A * | 4/1995 | Wise et al. | 700/304 |
| 5,406,485 A * | 4/1995 | Wise et al. | 701/29 |
| 5,486,758 A | 1/1996 | Hammerle | |
| 5,487,595 A * | 1/1996 | Wise et al. | 303/168 |
| 5,493,214 A * | 2/1996 | Good et al. | |
| 5,671,981 A * | 9/1997 | Sasaki et al. | |
| 5,819,193 A * | 10/1998 | Burgdorf et al. | |
| 6,170,923 B1 * | 1/2001 | Iguchi et al. | |
| 6,491,357 B2 * | 12/2002 | Holst | 303/122.03 |
| 6,538,427 B1 | 3/2003 | Silvasi et al. | |
| 7,248,991 B2 * | 7/2007 | Goebel et al. | 702/148 |
| 2001/0027362 A1 * | 10/2001 | Nishida et al. | |
| 2006/0052928 A1 * | 3/2006 | Kawasaki et al. | 701/93 |

FOREIGN PATENT DOCUMENTS

| | | | |
|---|---|---|---|
| DE | 10312208 B3 * | 7/2004 | |
| JP | 07198733 A * | 8/1995 | |
| KR | 2005105317 | * 11/2005 | |
| WO | WO2004/065966 | * 8/2004 | |

* cited by examiner

*Primary Examiner*—Bradley T King
(74) *Attorney, Agent, or Firm*—MacMillan, Sobanski & Todd, LLC (57) ABSTRACT

The output of a wheel speed sensor is sampled at dithered time intervals and the samples used to construct a pair of histograms representing high and low sample values. A minimum voltage threshold is determined as a function of the output voltage associated with the dominate histogram value for the low sample values. The output voltage associated with the dominant histogram value for the high sample values is compared to the minimum voltage threshold to determine whether a potential sensor wiring problem is developing.

15 Claims, 5 Drawing Sheets

SHADOW ZONE FAULT DETECTION

CROSS-REFERENCE TO RELATED APPLICATIONS

Not Applicable

BACKGROUND OF THE INVENTION

This invention relates in general to electronic brake control systems and in particular to a method for detecting a potential failure of wheel speed sensor wiring.

Many vehicles being currently produced by automotive manufacturers include electronic brake control systems that are integrated with their hydraulic brake systems. Such systems include anti-lock brake systems that prevent wheel lock-up during braking cycles, traction control systems to prevent slippage of driven wheels on low mu surfaces, rear brake boost systems that selectively increase the pressure applied to the vehicle rear wheel brakes and anti-roll control systems that provide roll over avoidance. Additionally, such systems also may assist in preventing loss of directional control when the vehicle is operated upon normal or even high mu surfaces, as can occur during accident avoidance maneuvers. All of the above functions may be incorporated as operating modes in a single electronic brake control system.

An electronic brake control system typically includes an electro-hydraulic control unit that is integrated with the brake lines of the hydraulic brake system. The electro-hydraulic control unit typically includes an Electronic Control Unit (ECU) that is mounted upon a hydraulic valve body. The ECU includes a microprocessor and control algorithm for operating the brake system. The algorithm and operating parameters for the vehicle are stored in a memory device that is electrically connected to the microprocessor. The memory device may be an integral part of the microprocessor or it may be separate therefrom. Additionally, the microprocessor is connected to and receives signals from vehicle operating parameter sensors, such as, for example, wheel speed sensors, vehicle motion sensors, a steering angle sensor and a throttle position sensor.

The hydraulic valve body includes a plurality of ports that are connected through hydraulic brake lines to components of the vehicle hydraulic brake system. A plurality of normally open and normally closed solenoid valves are disposed within the hydraulic valve body. The ECU is connected to the solenoid valve coils and operative to selectively actuate the valves. A pump also is typically mounted within the hydraulic valve body and is operative to supply pressurized brake fluid to the brake control system. The pump is controlled by the electronic control unit microprocessor.

During vehicle operation, the ECU microprocessor continuously receives signals from the various vehicle operating parameter sensors. When the microprocessor senses an impending vehicle control problem, the brake control system is activated. The microprocessor starts the pump to supply pressurized brake fluid and selectively actuates the solenoid valves to apply and relieve hydraulic pressure to the wheel brakes to correct the vehicle control problem.

Such electronic brake control systems typically include self-test algorithms to detect potential component failure. Among the components tested are the wheel speed sensors and the microprocessor in the ECU. These components are periodically tested to assure that they are properly functioning. Upon detecting a fault, the entire brake control system is disabled to assure safe operation of the vehicle and a warning, such the illumination of a lamp on the vehicle dashboard and/or sounding of an audio alarm, provided to the vehicle operator.

BRIEF SUMMARY OF THE INVENTION

This invention relates to a method for detecting a potential failure of wheel speed sensor wiring.

The present invention contemplates a method for monitoring an active wheel speed sensor that includes providing an active wheel speed sensor and sampling the high output signals of the wheel speed sensor at a dithered sampling rate. The sampled output signals are then used to construct a pair of histograms. The values within each of the resulting histograms are then compared to one another to determine if one value is dominate over the other histogram values. If a dominate value is found, the voltage corresponding to the dominate value in the histogram associated with lower sensor output signals is used to calculate a minimum voltage threshold. The voltage corresponding to the dominate value in the histogram associated with the higher sensor output signals is compared to the minimum voltage threshold and an error flag set upon the voltage being less than the minimum voltage threshold.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
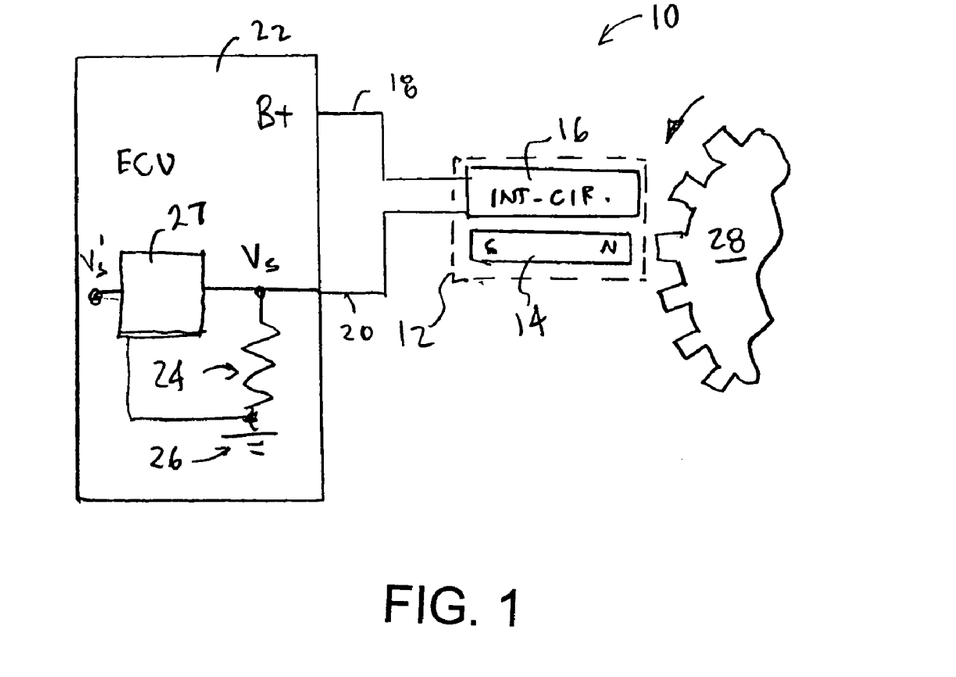
FIG. 1 is a schematic diagram of a circuit that includes active wheel speed sensor.

Referring now to the drawings, there is illustrated in FIG. 1 a schematic diagram of a circuit 10 that includes active wheel speed sensor 12 that is included in an electronic brake control system (not shown). The active wheel speed sensor 12 includes a permanent magnet 14 and an integrated circuit 16 that contains a magneto-resistive bridge (not shown). The speed sensor is connected by a pair of lead wires 18 and 20 to an electronic brake system Electronic Control Unit (ECU) 22. The ECU 22 supplies a sensor current from a voltage source B+ through one of the lead wires 18 to the integrated circuit 16. The integrated circuit 16 returns the sensor current through the other lead wire 20 to the ECU 22 where the current flows through a current sensing resistor 24 to ground 26. A speed voltage $V_S$ that is proportional to the sensor current is monitored by the ECU 22. The speed voltage $V_S$ is in turn applied to the input of a signal conditioning circuit 27 that amplifies the voltage to a voltage level $V_S'$ that is sufficient to trigger edge capture logic within the ECU microprocessor (not shown). As shown in FIG. 1, one end of the speed sensor 16 is located adjacent to a toothed tone ring 28 that is mounted upon a vehicle wheel (not shown).

Figure 2:
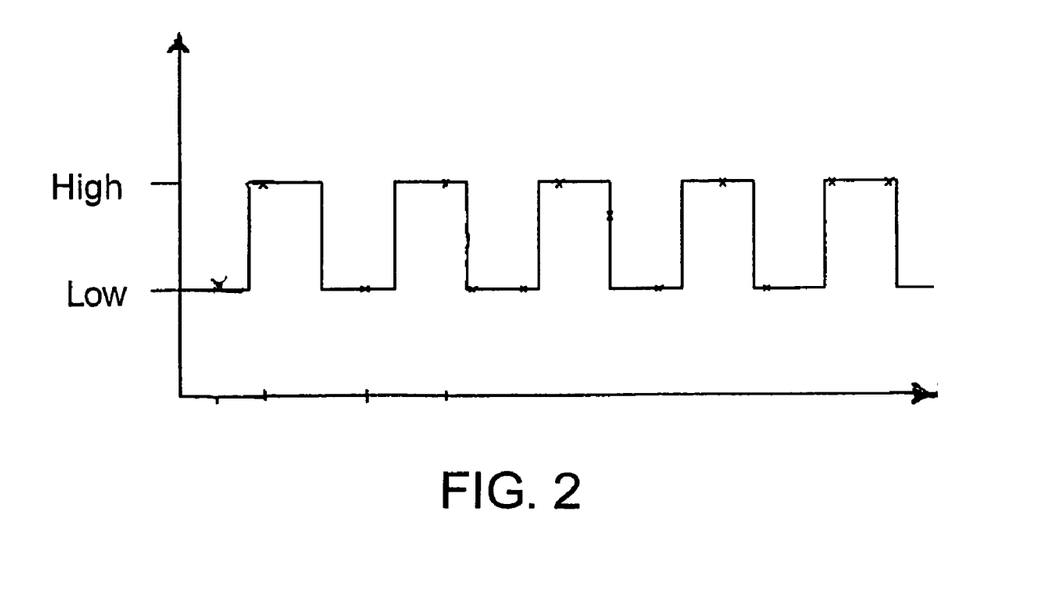
FIG. 2 is a graph illustrating the output signal generated by the active wheel speed sensor shown in FIG. 1.

During operation, the tone ring 28 rotates with the vehicle wheel. The resistance of the magneto-resistive bridge changes due to variation of the magnetic field surrounding the wheel speed sensor 12 as the tone ring teeth rotate past the end of the sensor 12. Thus, the sensor current is decreased to a low value as a valley between the tone ring teeth passes the sensor 12 and increases to a high value when a tone ring tooth passes the sensor. Typical output voltages appearing across the sensing resistor $V_S$ due to the sensor current vary between 0.5 volts for the low sensor current and 1.0 volts for the high sensor current. A typical amplified sensor signal $V_S'$, at the output of the signal conditioning circuit 27 that fluctuates between high and low values, is shown in FIG. 2.

Figure 3:
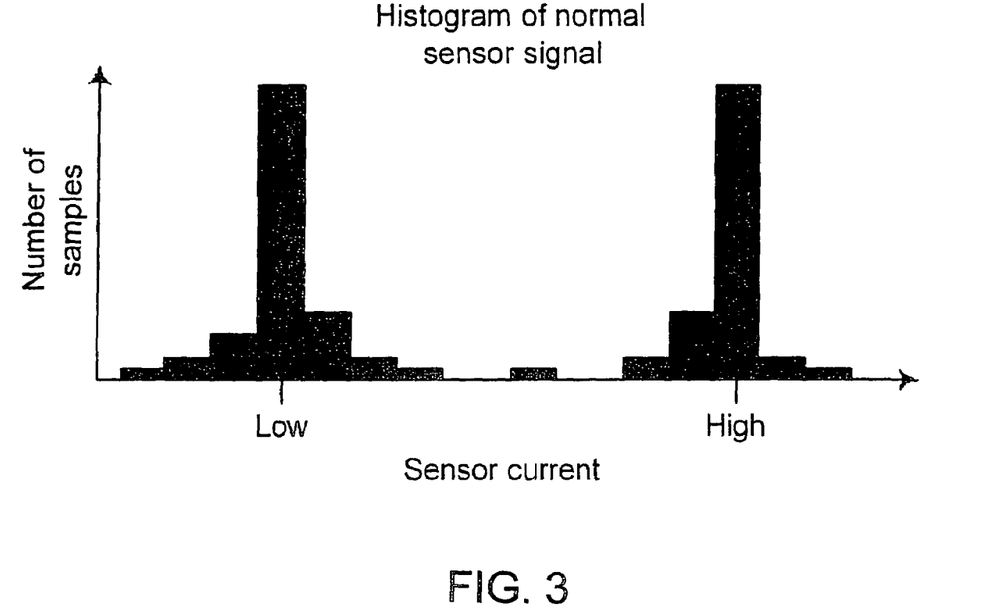
FIG. 3 is a histogram illustrating normal operation of the active wheel speed sensor shown in FIG. 1.

When the wheel speed sensor 12 is operating normally, the high and low voltage signals appearing across the sensing resistor 24 cluster about nominal high and low voltage values, as illustrated by the histogram shown in FIG. 3. In FIG. 3, the histogram is determined by sampling the output sensor output signal $V_S'$ at a constant periodic rate. However, the sensor output as measured across the sensing resistor 24 may change from the expected values if the wiring resistance increases, as may be caused by corrosion of wiring harness connectors.

Figure 4:
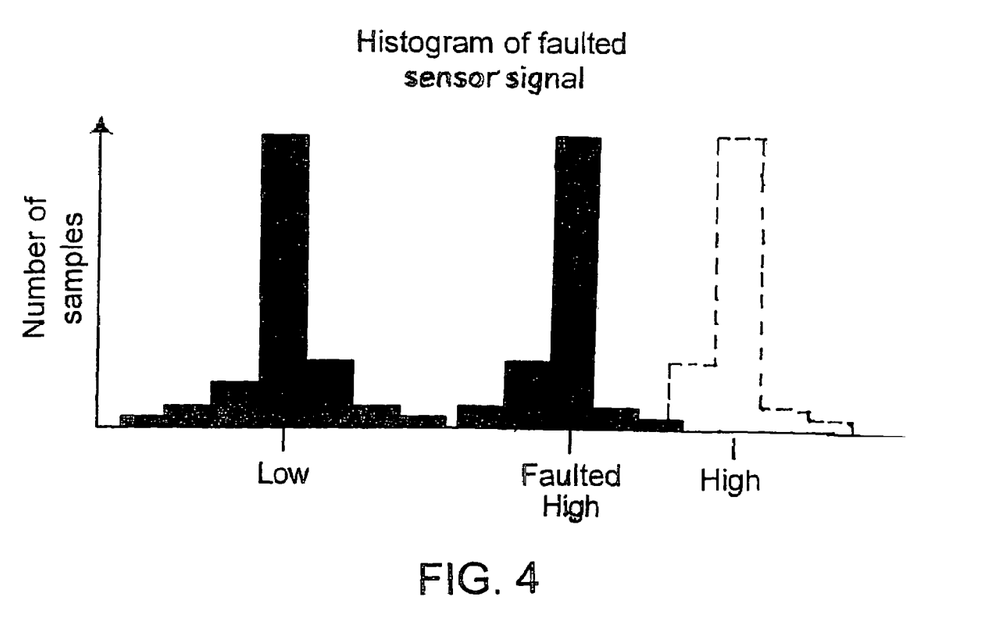
FIG. 4 is a histogram illustrating faulted operation of the active wheel speed sensor shown in FIG. 1.

When the wiring resistance is sufficiently high, the voltage drops between the supply voltage B+ and the ground 26 start to limit the high-level current that can be output from the sensor 12. Under these conditions, the low-level current will still be correct, but the high-level current may be less than the value listed in the sensor specifications. Accordingly, the histogram of high voltage levels shifts down, as illustrated in FIG. 4, where the output sensor output signal $V_S'$ is again sampled at the same constant periodic rate used to determine the histogram shown in FIG. 3. In FIG. 4, the histogram for a normal high sensor signal is shown outlined with dashed lines. Additionally, as wheel speed increases, the signal frequency also increases, and the signal conditioning circuit 27 may drop out when the wheel speed reaches a certain speed.

For prior art systems, the diagnostic algorithms in the ECU 22 will detect the sensor drop out and set a diagnostic code indicating that a sensor failure has occurred. The ECU 22 will then disable the algorithms that utilize the wheel speed sensor signal. Furthermore, the ECU 22 will turn on a visual signal that will signal the vehicle operator that systems have been disabled and service is required. Typically, a service technician at the service center will interpret the diagnostic code generated by the ECU 22 as requiring replacement of the sensor 12 and/or the tone ring 28 when the wiring harness is actually the cause of the fault.

Figure 5:
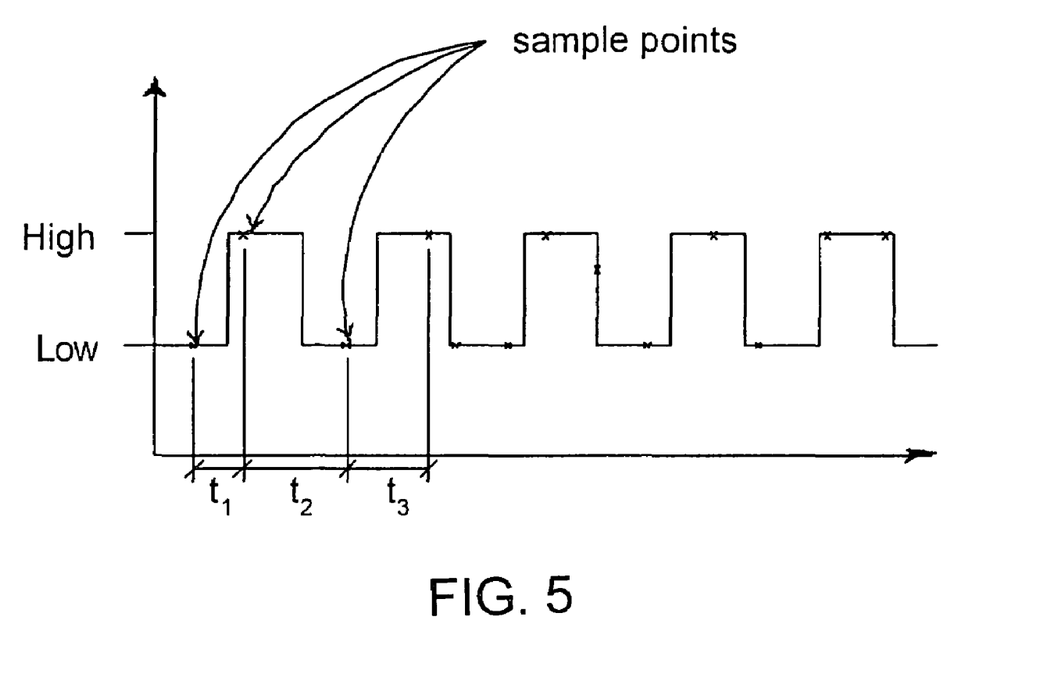
FIG. 5 is a graph illustrating sampling of the output signal generated by the active wheel speed sensor shown in FIG. 1 that is in accordance with the present invention.

The present invention is directed to an algorithm for detecting the shift of the high sensor output values as an indication of the increase of wiring harness resistance. The algorithm utilizes data obtained with a low sampling rate to construct high and low histograms of the sensor output signal that are similar to the histograms shown in FIGS. 3 and 4. However, the sampling frequency is selected to extract only the dominant current levels present in the output signal that make up greater than 99 percent of the signal content, not to reconstruct the signal. Accordingly, the sampling frequency is less than a Nyquist frequency associated with the speed sensor. However, when a signal is sampled at less than a Nyquist frequency there is a possibility that the sampling may occur at the transition between high and low signals or during only high or low signals. Therefore, the invention also contemplates introducing dithering into the sampling rate such that the time between samples is not constant. The dithering of the sampling points is illustrated in FIG. 5 where the sampling time $t_n$ varies between each of the samples by the following relationship:

$$a < t_n < b$$

where a and b are lower and upper limits, respectively, of the dithered sampling period.

Additionally, the algorithm addresses the possibility of always sampling during the high or low portions of the cycle by limiting the lowest vehicle speed, $V_{MIN}$, at which the algorithm will operate and performing analysis of the resulting histograms when there is only one dominate voltage level associated with the sensor current indicated for each of the histograms. A voltage threshold, $V_{TH}$, is then calculated as a function of the nominal low voltage, $V_L$, corresponding to the dominate value in the low signal histogram. The nominal high voltage, $V_H$, corresponding to the dominate value in the high signal histogram is then compared to the threshold voltage $V_{TH}$. Should the nominal high voltage $V_H$ fall below the threshold voltage $V_{TH}$, it is an indication that the wiring resistance has increased sufficiently that the harness should be replaced before a false sensor and/or tone ring failure signal is generated. By applying the algorithm to wheel speed signals, it is possible to detect a faulted signal path prior to complete loss of the signal, thus avoiding possible unwarranted activations of the brake system by the ECU 22. Also, the algorithm provides a correct problem diagnostic that the wiring harness, and not the ECU 22 and/or the tone ring 28, is at fault.

Figure 6:
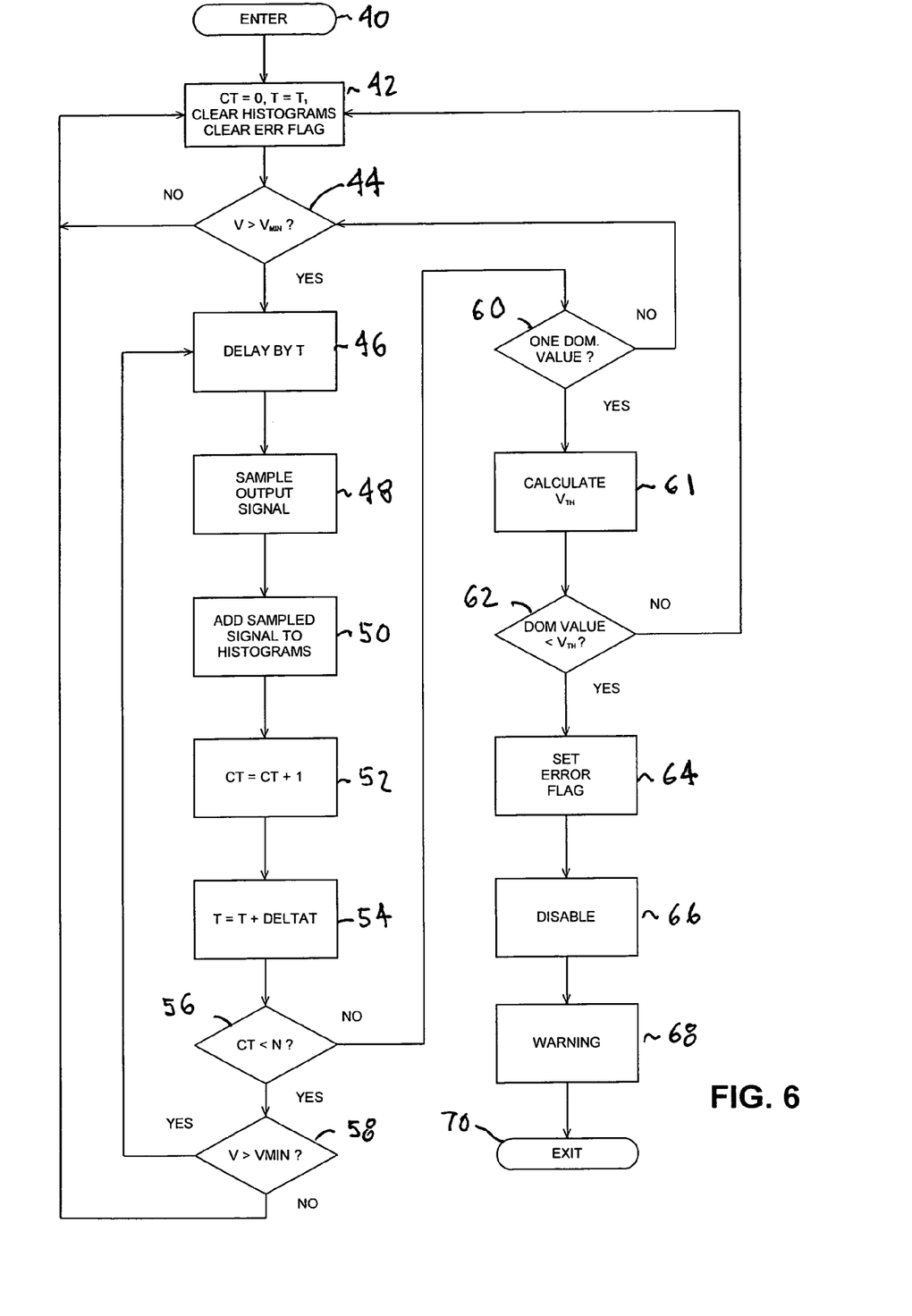
FIG. 6 is a flow chart illustrating the present invention.

The algorithm is illustrated by the flow chart shown in FIG. 6. The flow chart is entered through block 40 and advances to functional block 42 where initialization of algorithm variable parameters takes place. The initialization includes zeroing an iteration counter, CT, setting a sample delay interval, T, to an initial sample period, $T_1$, clearing the output signal histograms and clearing an error flag. The algorithm then continues to decision block 44 where the vehicle speed is compared to a minimum vehicle speed, $V_{MIN}$.

If, in decision block 44, the vehicle speed is less than or equal to the minimum vehicle speed $V_{MIN}$, the algorithm returns to functional block 42. If, in decision block 44, the vehicle speed is greater than the minimum vehicle speed $V_{MIN}$, the algorithm continues to functional block 46. Thus, the algorithm only proceeds when the vehicle speed is greater than a predetermined threshold speed. In functional block 46, a delay of T occurs. Once the delay is completed, the output signal is sampled in functional block 48 and the sample quantized for use in the output histograms. Because the sensor signal varies between high and low values, two histograms, similar to the histograms shown in FIGS. 3 and 4 and corresponding the high and low signals are developed. The algorithm continues to functional block 50 where the quantized sampled output portion signal is assigned to either the high signal histogram or the low signal histogram. Then the selected output histogram is indexed. The iteration counter CT is increased by one in functional block 52 and the algorithm advances to functional block 54.

In functional block 54, the delay time T is changed by DELTAT, an incremental time that represents the dithering of the sampling period. Thus, DELTAT may be positive or negative and is selected such that the sum of T and DELTAT lies between lower and upper sampling time limits, a and b, respectfully. In the preferred embodiment, DELTAT is provided from a random number generator; however, DELTAT also may be generated by other devices. The algorithm then continues to decision block 56.

In decision block 56, the iteration counter CT is compared to a minimum number N of iterations needed for generating meaningful output signal histograms. The number or iterations N is predetermined based upon the specific application. If the minimum number of iterations N has not been reached, the algorithm transfers to decision block 58 where the vehicle speed is again compared to the minimum vehicle speed $V_{MIN}$. If the vehicle speed is still greater than $V_{MIN}$, the algorithm transfers back to functional block 46 for another delay period T and obtains another sensor output signal sample in functional block 48. The algorithm then continues as described above. If, in decision block 58, the vehicle speed has fallen to, or below, the minimum vehicle speed, $V_{MIN}$, the algorithm transfers back to functional block 42 where the variable parameters are reset and the algorithm starts over.

Returning to decision block 56, if the minimum number of iterations N has been reached, the algorithm transfers to decision block 60 where the both high output signal and low output signal histograms are reviewed to determine whether there is one dominant histogram value in each of the histograms. The dominant histogram is determined by comparing the individual histogram values within each of the histograms to one another. If one of the values in each of the histograms is found to exceed each of the other values by at least a predetermined increment, $\Delta H_H$ for the high output signal histogram and $H_L$ for the low output signal histogram, that histogram value is selected as the dominant value. If one dominant histogram value is not found for each of the histograms in decision block 60, the algorithm transfers back to decision block 44 and, providing that the vehicle speed has not fallen below the minimum vehicle speed $V_{MIN}$, continues as described above to sample another sensor output value to further develop the output signal histograms. This process continues until it is determined in decision block 60 that there is one dominant histogram value for each of the histograms, at which point the algorithm transfers to functional block 61.

In functional block 61, a high histogram voltage threshold, $V_{TH}$, is calculated as function of the nominal low voltage $V_L$ dominate associated with the dominate value of the low output signal histogram. In the preferred embodiment, the voltage threshold $V_{TH}$ is determined by multiplying the nominal low voltage by a constant K that is a function of the wheel speed sensor specification and that represents the minimum ratio between the high and low sensor output currents. Thus, the threshold voltage is determined by the following formula:

$$V_{TH} = K * V_L;$$

where K may be other than an integer value.

While the preferred embodiment utilizes a constant multiplier to determine the voltage threshold value $V_{TH}$, it will be appreciated that the invention also may be practiced with other functional relationships for determining $V_{TH}$. Thus, the threshold voltage $V_{TH}$ also may be calculated from the nominal low voltage $V_L$ by a linear or non-linear relationship. Once the threshold voltage $V_{TH}$ has been calculated in functional block 61, the algorithm advances to decision block 62.

In decision block 62, the high output voltage $V_H$ corresponding to the single dominant histogram value in the high output signal histogram is compared to the threshold voltage value $V_{TH}$ calculated in functional block 61. If the single dominant high histogram value $V_H$ is greater than or equal to the threshold value $V_{TH}$, the system is functioning properly and the algorithm returns to functional block 42 where the variable parameters are reset and the algorithm starts over. If, in decision block 62, the single dominant high histogram value $V_H$ is less than the threshold voltage value $V_{TH}$, the histogram for the upper output value has moved sufficiently to the left on the horizontal axis of FIG. 4 to indicate a potential wiring harness problem, but not far enough for the sensor signal to drop out. Accordingly, the algorithm transfers to functional block 64 where the error flag is set. The algorithm continues to functional blocks 66 and 68, where the system, or systems, controlled by the microprocessor and that utilize the wheel speed sensor signals is disabled and a warning provided to the vehicle operator, respectively. The warning may consist of illumination of a lamp upon the vehicle dashboard and/or an audible sound. The steps shown in functional blocks 66 and 68 are to be considered optional. Thus, a warning may provided to operator without disablement of the system or the error flag may set a diagnostic code that would be read by a service technician during routine vehicle servicing. Finally, the algorithm exits though functional block 70.

As a result of the operation of the algorithm, the service technician will be able to identify the correct faulty component and replace the wiring harness. This repair is not only the correct one needed to remedy the fault, but also usually less expensive that the replacement of the wheel speed sensor 12 and/or the tone ring 28.

While the preferred embodiment has been illustrated and described with the histograms being reset and their development restarted upon the vehicle speed exceeding the minimum $V_{MIN}$, it will be appreciated that the invention also may be practiced without a reset and restart. Accordingly, an alternate embodiment of the method is illustrated by the flow chart shown in FIG. 7 where blocks that are the same as the blocks shown in FIG. 6 have the same numerical identifiers. In the alternate embodiment, the branches from decision blocks 56 and 60 that returned to the speed checking decision block 44 in FIG. 6 now return to the time delay block 46. Additionally, the speed checking decision block 58 shown in FIG. 6 has been deleted and a new speed checking decision block 80 has been added between the time delay block 46 and the single sampling block 48. Thus, upon the vehicle speed falling to or below the minimum speed $V_{MIN}$ after either checking the iteration counter CT or for one dominant value id decision block 60, the algorithm will no longer reset and restart. Instead, the vehicle speed is checked in decision block 80 before the sensor output is sampled. If the vehicle speed has fallen to or below the minimum speed $V_{MIN}$, the algorithm transfers to the time incrementing block 54, skipping the sampling of the wheel speed output signal and the indexing of the histograms shown in blocks 48, 50 and 52. Only if the vehicle speed exceeds the minimum speed $V_{MIN}$ will the algorithm sample the sensor output and update the histograms. Otherwise, the algorithm shown in FIG. 7 functions as described above to include resetting and restarting upon finding one dominant value for the high signal histogram $V_H$ that is less than the threshold voltage $V_{TH}$. As a result, the algorithm shown in FIG. 7 continues to accumulate data points and develop histograms as the vehicle speed varies above and below the minimum threshold speed $V_{MIN}$.

Figure 7:
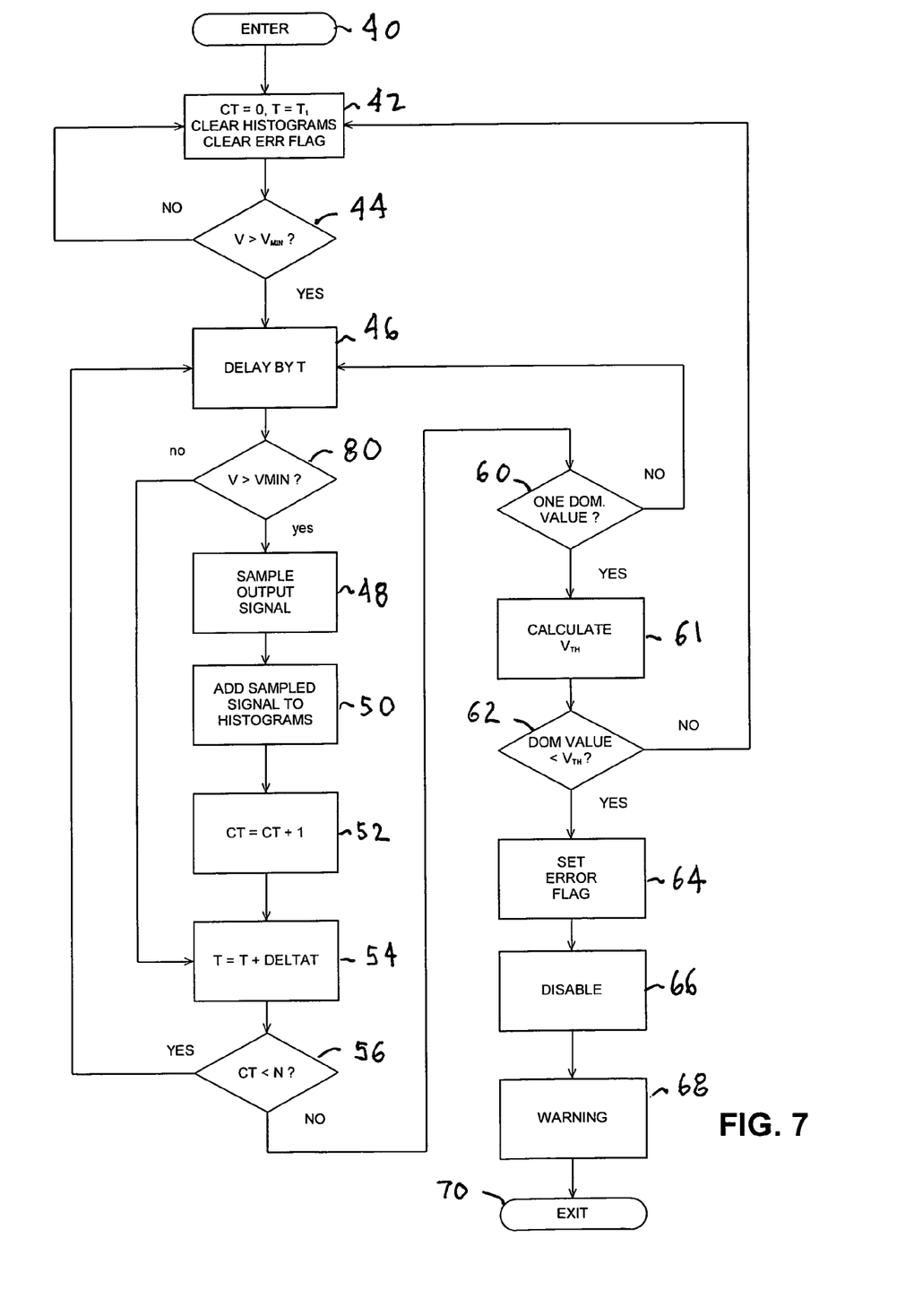
FIG. 7 is an alternate embodiment of the flow chart shown in FIG. 6.

It will be appreciated that the flow charts shown in FIGS. 6 and 7 are exemplary and that the invention also may be practiced other than illustrated by the flow charts.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for monitoring an active wheel speed sensor comprising the steps of:
   (a) providing an active wheel speed sensor that generates alternating high and low output signals;
   (b) sampling the high and low output signals of the wheel speed sensor within a sampling range that is dithered;
   (c) constructing high and low histograms corresponding to the high and low output signal samples obtained in step (b);
   (d) comparing the histogram values within each of the histograms to one another to determine whether a single histogram value for each of the histograms is dominate over the other values contained in that histogram;
   (e) comparing a voltage corresponding to the single dominant value of the high histogram to a threshold voltage value that is determined by the following formula:

$V_{TH}=K*V_L$, where $V_{TH}$ is the voltage threshold,
   $V_L$ is the voltage value associated with the dominate value of the low histogram, and
   K is a constant associated with the wheel speed sensor; and
   (f) setting an error flag upon the voltage corresponding to the single dominant value of the high histogram being less than the threshold voltage value.

2. The method according to claim 1 wherein the active wheel speed sensor provided in step (a) is included in a vehicle electronic brake control system and further wherein the speed of the vehicle carrying the wheel speed sensor is compared to a predetermined minimum vehicle speed in step (b) and the method proceeds to step (c) only if the vehicle speed is greater than or equal to the minimum vehicle speed.

3. The method according to claim 2 wherein the sensor output sampling rate is less than a Nyquist frequency associated with the speed sensor.

4. The method according to claim 3 where a sampling time $t_n$ utilized in step (b) varies in accordance with the following relationship:

$a<t_n<b$, where a and b are lower and upper limits, respectively, of the dithered sampling period.

5. The method according to claim 4 wherein the single dominate histogram value is determined in step (d) when one of the histogram values exceeds all of the other histogram values by a minimum threshold difference.

6. A method for monitoring an active wheel speed sensor comprising the steps of:
   (a) providing an active wheel speed sensor that generates alternating high and low output signals;
   (b) sampling the high and low output signals of the wheel speed sensor within a sampling range that is dithered;
   (c) constructing high and low histograms corresponding to the high and low output signal samples obtained in step (b);
   (d) comparing the histogram values within each of the histograms to one another to determine whether a single histogram value for each of the histograms is dominate over the other values contained in that histogram;
   (e) comparing a voltage corresponding to the single dominant value of the high histogram to a threshold voltage value that is determined by the following formula:

$V_{TH}=K*V_L$, where $V_{TH}$ is the voltage threshold,
   $V_L$ is the voltage value associated with the dominate value of the low histogram, and
   K is a minimum ratio between high and low current output signals for the wheel speed sensor; and
   (f) setting an error flag upon the voltage corresponding to the single dominant value of the high histogram being less than the threshold voltage value.

7. The method according to claim 6 wherein the active wheel speed sensor provided in step (a) is included in a vehicle electronic brake control system and further wherein the speed of the vehicle carrying the wheel speed sensor is compared to a predetermined minimum vehicle speed in step (b) and the method proceeds to step (c) only if the vehicle speed is greater than or equal to the minimum vehicle speed.

8. The method according to claim 7 wherein the sensor output sampling rate is less than a Nyquist frequency associated with the speed sensor.

9. The method according to claim 8 where a sampling time $t_n$ utilized in step (b) varies in accordance with the following relationship:

$a<t_n<b$, where a and b are lower and upper limits, respectively, of the dithered sampling period.

10. The method according to claim 9 wherein the single dominate histogram value is determined in step (d) when one of the histogram values exceeds all of the other histogram values by a minimum threshold difference.

11. A method for monitoring an active wheel speed sensor comprising the steps of:
    (a) providing an active wheel speed sensor that generates alternating high and low output signals;
    (b) sampling the high and low output signals of the wheel speed sensor within a sampling range that is dithered;
    (c) constructing high and low histograms corresponding to the high and low output signal samples obtained in step (b);
    (d) comparing the histogram values within each of the histograms to one another to determine whether a single histogram value for each of the histograms is dominate over the other values contained in that histogram;
    (e) comparing a voltage corresponding to the single dominant value of the high histogram to a threshold voltage value that is a non-linear function of the voltage value associated with the dominate value of the low histogram; and
    (f) setting an error flag upon the voltage corresponding to the single dominant value of the high histogram being less than the threshold voltage value.

12. The method according to claim 11 wherein the active wheel speed sensor provided in step (a) is included in a vehicle electronic brake control system and further wherein the speed of the vehicle carrying the wheel speed sensor is compared to a predetermined minimum vehicle speed in step (b) and the method proceeds to step (c) only if the vehicle speed is greater than or equal to the minimum vehicle speed.

13. The method according to claim 12 wherein the sensor output sampling rate is less than a Nyquist frequency associated with the speed sensor.

14. The method according to claim 13 where a sampling time $t_n$ utilized in step (b) varies in accordance with the following relationship:

$a<t_n<b$, where a and b are lower and upper limits, respectively, of the dithered sampling period.

15. The method according to claim 14 wherein the single dominate histogram value is determined in step (d) when one of the histogram values exceeds all of the other histogram values by a minimum threshold difference.

* * * * *